(No Model.)

G. W. MARTIN.
COASTING SLED.

No. 312,646. Patented Feb. 24, 1885.

Witnesses
S. N. Piper.
Ernest B. Pratt.

Inventor
George W. Martin,
by R. H. Eddy atty.

UNITED STATES PATENT OFFICE.

GEORGE WASHINGTON MARTIN, OF MEDFORD, MASSACHUSETTS.

COASTING-SLED.

SPECIFICATION forming part of Letters Patent No. 312,646, dated February 24, 1885.

Application filed December 12, 1884. (No model.)

*To all whom it may concern:*

Be it known that I, GEORGE WASHINGTON MARTIN, of Medford, in the county of Middlesex, of the Commonwealth of Massachusetts, have invented a new and useful Improvement in Coasting-Sleds; and I do hereby declare the same to be described in the following specification and represented in the accompanying drawings, of which—

Figure 1:
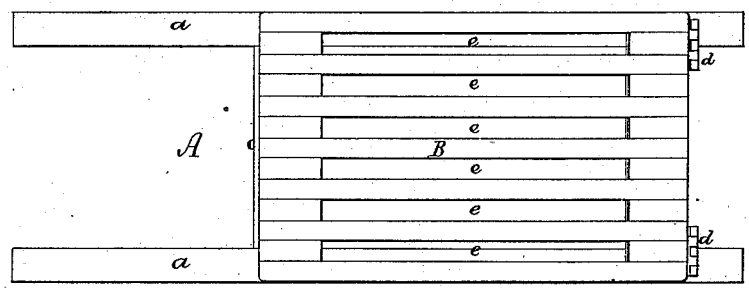
Figure 2:
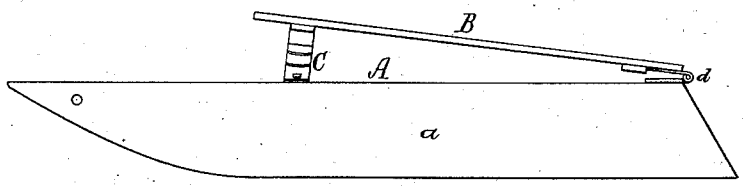
Figure 3:
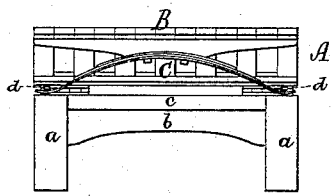
Figure 4:
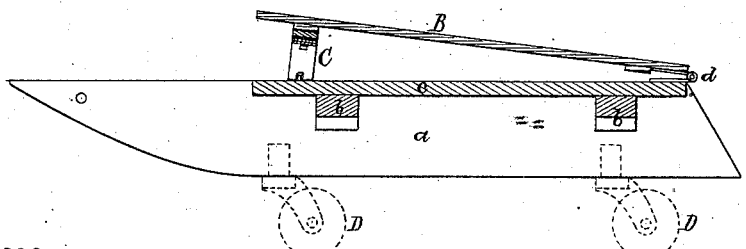

Figure 1 is a top view, Fig. 2 a side elevation, Fig. 3 a front view, and Fig. 4 a longitudinal section, of a sled provided with my invention, the nature of which is defined in the claims hereinafter presented.

In the said drawings, a common coasting-sled is represented at A as composed of two runners, $a\ a$, transverse connection-bars $b\ b$, and a top or seat, $c$, the latter being fixed on the tops of the said bars and extending from one to the other of the runners.

In carrying out my invention I combine with the said sled or the runners and their connections a grid or seat, B, connected at its rear end or part by hinges $d$ to the rear part of the top of the sled, and inclined at an acute angle to such top, such seat B being supported near its front end on one or more springs, C, extending between it and the top of the sled. By having the seat B inclined, as represented, to the body of the sled a person when coasting with the sled inclined on a declivity has his seat horizontal, or nearly so, or inclined backward, and thus not only sits thereon to better advantage, but is prevented from sliding forward off the sled on its passing over an obstacle and its velocity more or less lessened thereby. By having the seat supported by a spring or springs the seat is rendered easier for a person when using the sled for coasting with it.

For coasting on an inclined surface uncovered by snow or ice, the sled may have removable casters D projected from and below its runners, as represented.

When the seat B is formed with slots $e$ in it as shown, snow will not readily collect or remain on it, as such snow will mostly, if not entirely, fall through the slots, and by reason of the seat being inclined to the top of the sled it becomes more inclined while the sled is being drawn up a declivity, and consequently the discharge of the snow from the seat will be facilitated thereby.

I claim—

1. The combination of a coasting-sled with a seat hinged at its rear to the sled and inclined to the top thereof, and supported on a spring or springs arranged between such top and seat at or near the front of the latter, all being substantially as set forth.

2. The combination of a coasting-sled with a seat having perforations or slots through it, and hinged at its rear to the top of the sled, and inclined to such top, and supported on a spring or springs arranged between it and the sled, all being substantially as represented.

3. The combination of a coasting-sled with a seat hinged thereto and inclined to the top thereof, and supported on a spring or springs arranged below such seat, all being substantially as set forth.

4. The combination of a coasting-sled with a seat hinged thereto, and supported on or by a spring or springs properly arranged relatively to or under such seat.

GEORGE WASHINGTON MARTIN.

Witnesses:
R. H. EDDY,
E. B. PRATT.